United States Patent [19]

Baldwin et al.

[11] 4,134,345
[45] Jan. 16, 1979

[54] RETRACTABLE GUIDE LATCH MECHANISM

[75] Inventors: Floyd G. Baldwin, Garden Grove, Calif.; Stanley V. Voorhees, Zephyr Cove, Nev.

[73] Assignee: McDonnell Douglas Corporation, Long Beach, Calif.

[21] Appl. No.: 832,161

[22] Filed: Sep. 12, 1977

[51] Int. Cl.² .......................... B61D 41/00; B65J 1/22
[52] U.S. Cl. ................................ 105/366 B; 105/465; 244/137 R; 214/84
[58] Field of Search ............... 105/464, 366 E, 366 C, 105/368 B, 366 D, 465, 206 R, 366 B, 463; 24/201 R, 201 A; 248/119 R; 214/516, 84; 294/83 R; 296/35 A; 244/118 R, 137 R

[56] References Cited

U.S. PATENT DOCUMENTS 3,933,101 1/1976 Blas .................................. 105/366 B Primary Examiner—Francis S. Husar
Assistant Examiner—Frank F. Atwood
Attorney, Agent, or Firm—John P. Scholl; Walter J. Jason; Donald L. Royer

[57] ABSTRACT

A guide latch mechanism to restrain cargo in three directions. The mechanism retracts to permit cargo to pass over the mechanism and automatically erects to a vertical position for future use.

10 Claims, 6 Drawing Figures

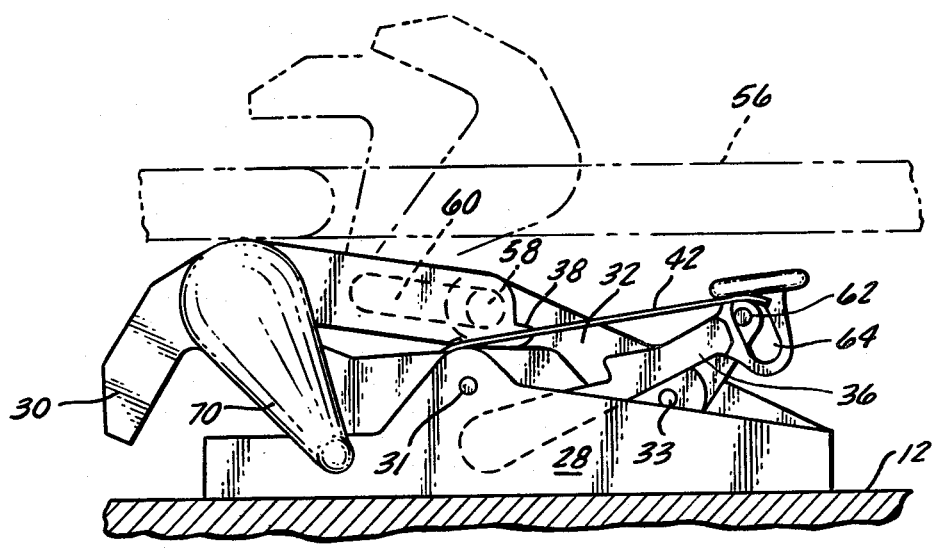
FIG_5
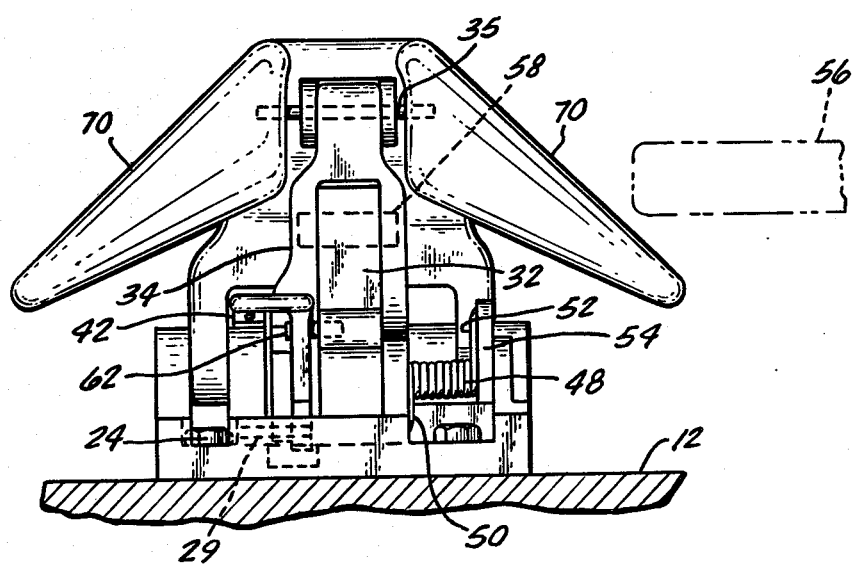
FIG_6

RETRACTABLE GUIDE LATCH MECHANISM

BACKGROUND OF THE PRESENT INVENTION

Large, wide-bodied aircraft are being used more extensively for the hauling of freight which is loaded on various sized pallets and in a variety of containers. Flexibility and simplicity in the loading and anchoring of the cargo are the keys to fast and economical operation of such aircraft. The pallets and cargo containers vary in size and may be, for example, 88 inches, 96 inches, or 196 inches wide.

The cargo is normally moved around the decks of freighter aircraft on rollers. Previously, when a mix of containers was being loaded, the container guide and latch mechanisms would normally have to be removed or re-adjusted to permit a variety of sized containers to be loaded. Some of the prior art mechanisms would fold down to permit oversized containers to pass over the mechanisms.

These prior art retractable guide/latch mechanisms normally only restrained the cargo in two directions, either in vertical and lateral direction or in a vertical and longitudinal direction. The advantage of the present inventive mechanism is that it is not only retractable to permit oversized containers to pass over the mechanism, but also restrains the cargo in three directions — vertical, lateral and longitudinal.

SUMMARY OF THE PRESENT INVENTION

The retractable guide and latch mechanism consists of a latch pawl, extensible linkage, a lock/release lever, a base and three springs. The latch pawl is configured to react to longitudinal, lateral and vertical loads. The restraint mechanism is normally mounted in a channel with only the latch pawl and a portion of the linkage extending above the level of the rollers or ball bearings on which the cargo moves. The pawl has two horn-shaped protrusions that engage oversized pallets or containers which overlap the mechanism. Regardless of whether the mechanism is in the erected and locked or unlocked position, the mechanism will fold down so that a container or a pallet can pass over the mechanism. When the container or pallet has passed over the restraint, it erects to an unlocked position in preparation for use.

Locking of the mechanism after the load is positioned is achieved by pressing directly on the overcenter linkage. By pressing on the overcenter linkage the latch pawl is moved into the hold position. The linkage is held in the overcenter position by a spring-loaded lock-/release or detent lever.

The overtravel of the lock/release lever is such that the latch pawl may follow pallet shifting without unloading the overcenter link. When the lock/release or detent lever is manually depressed, it initially releases the overcenter link, further downward movement applies an unlocking moment to the overcenter linkage.

BRIEF DESCRIPTION OF THE DRAWINGS

FIG. 5 is a vertical sectional view from the side of the inventive mechanism in the folded down position permitting the overpassage of a pallet; and FIG. 6 is a vertical sectional view from the rear of the mechanism in the locked position.

DETAILED DESCRIPTION OF ILLUSTRATIVE EMBODIMENT

Figure 1:
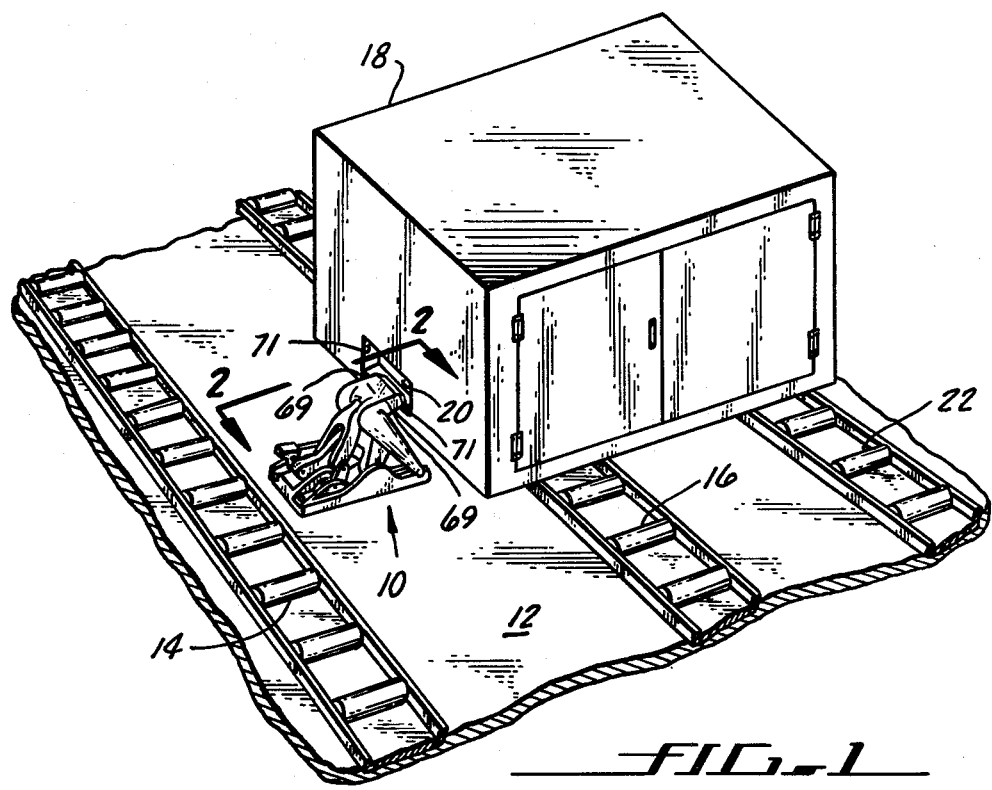
FIG. 1 depicts the inventive retractable guide and latch mechanism in the locked position, the pawl extending into a cavity in the side of a cargo container.

In FIG. 1 the inventive guide and latch mechanism 10 is shown attached to aircraft floor 12 between two sets of rollers, 14, 16.

The mechanism 10 has engaged cargo container 18 in a cavity 20 in the container. Cargo container 18 rests upon roller sets 16 and 22.

Figure 2:
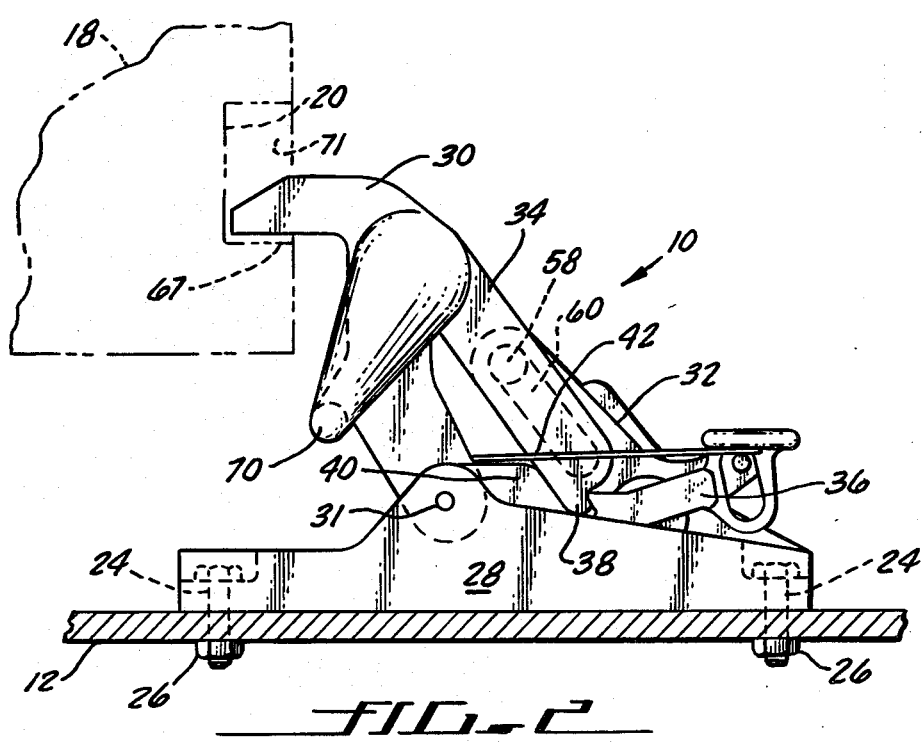
FIG. 2 is a vertical sectional view from the side of the inventive mechanism in the locked position along the line 2—2 of FIG. 1.

In FIG. 2 the attachment of guide and latch mechanism 10 to the aircraft floor 12 by bolts 24 and nuts 26 is depicted.

The guide and latch mechanism 10 has a base 28, upon which a latch pawl 30 is mounted for rotation on shaft 31. A first link 32 is mounted for rotation on a second shaft 33 (see FIG. 5) attached to the base 28. A second link 34 is attached to the end of first link 32 not attached to the base 28 (FIG. 2). The other end of the second link 34 is rotatably attached to the latch pawl 30 by pin 35 (see FIG. 6). The first link 32, attached to the base 28, and the second link 34, attached to the latch pawl 30, are connected in such a manner that they can be extended and moved into an overcenter position to lock the latch pawl 30 in a locked or engaged position (FIG. 2).

A lock/unlock or detent lever 36 is hinged by pin 29 (FIG. 6) to the base 28 and engages a shoulder 38 on the second link 34 (FIG. 2). The movement of the links in the overcenter position is limited when second link 34 engages stop 40 located on base 28. Link 34 is held against the stop 40 by detent lever 36.

The detent lever 36 is spring-loaded to the up or locked position by a leaf spring 42 so that the detent lever 36 engages the shoulder 38 on second link 34. This spring-loading of the detent lever 36 to the up position permits the latch pawl 30 to follow the shifting of the pallet or the container without unloading the overcenter linkage and unlocking the guide and latch mechanism 10.

Figure 4:
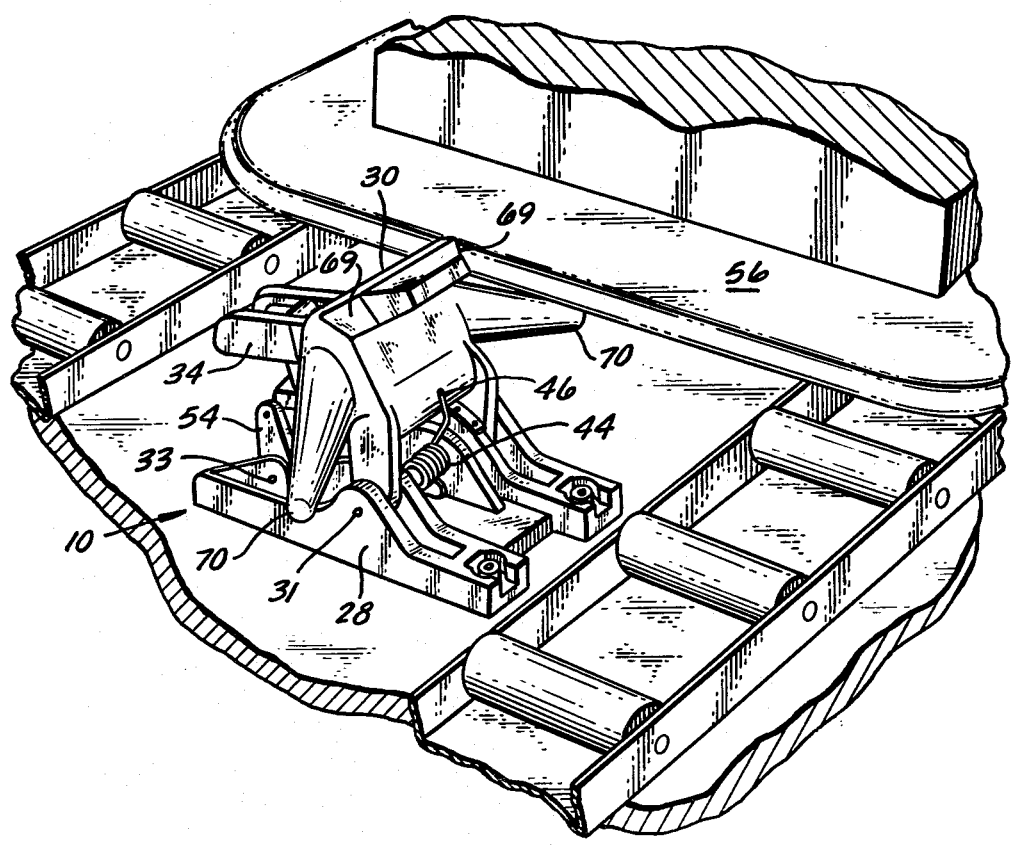
FIG. 4 is an oblique view of the inventive mechanism in the unlocked position with an overlapping pallet contacting the horn-shaped protrusion located on the pawl.

The latch pawl 30 is spring-loaded to the unlocked position as depicted in FIG. 4 by a coil spring 44 mounted on the first shaft 31. One end of the coil spring 44 is anchored in base 28 and the other end 46 bears against the latch pawl 30.

The first link 32 is keyed (not shown) to the second shaft 33 (FIG. 5). The second shaft 33 is spring-loaded for clockwise rotation, FIGS. 3 and 5, (e.g., away from the locked position) by a second coil spring 48 (FIG. 6). Spring 48 surrounds the second shaft 33 and the first end 50 is anchored to the base 28. The second end 52 of the second coil spring 48 is anchored in a lever arm 54 (FIG. 4 and FIG. 6). Arm 54 is keyed (not shown) to the second shaft 33. The second coil spring 48 therefore imparts a clockwise rotation (e.g., away from the locked position) to the first link 32 as shown in FIG. 2 which is mounted for rotation on the second shaft 33.

Figure 3:
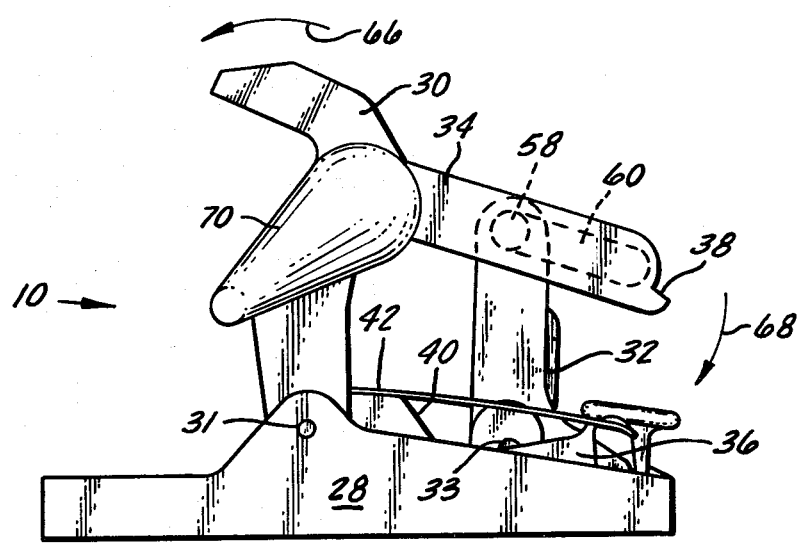
FIG. 3 is a vertical sectional view from the side of the inventive mechanism in the unlocked position.

Coil spring 44 rotates the latch pawl 30 toward the unlocked position as shown in FIG. 3. Coil spring 48 similarly rotates the first link 32 toward the unlocked position. The moment of spring 48 is stronger than the moment imparted by spring 44 and consequently it can override the moment imparted to pawl 30 and insure when the links move toward the unlock position that links will move past the overcenter position as shown in FIG. 2.

The rotational attachment between first link 32 and the second link 34 is a pin 58, phantomed in FIGS. 2, 3, 5 and 6. The pin 58 in first link 32 rides in a groove 60 (phantomed in FIGS. 2, 3 and 5) in second link 34. When the latch pawl 30 is rotated in a counterclockwise direction to a flattened position (FIG. 5) to permit the passage of a pallet 56, the attachment point between the first link 32 and the second link 34 is offset and the links are at their maximum extension. When the latch pawl 30 is rotated clockwise (FIG. 3) by coil spring 44 to the unlocked position as shown in FIG. 3, pin 58 has moved to the opposite end of groove 60 and links 32 and 34 are in the shortest or most compact position.

To initiate movement of the links a second pin 62 is mounted on the first link 32 and rides in a slot 64 in the detent lever 36 (FIGS. 5 and 6). When the detent lever 36 is first depressed, it disengages from shoulder 38 on second link 34. When the lever 36 is depressed further, it engages pin 62 in link 32 and rotates first link 32 in a clockwise direction to the unlocked position as shown in FIG. 3.

In operation, with the guide latch mechanism 10 in the unlocked position as shown in FIG. 3, a cargo container 18 is moved into position as shown in FIG. 1.

To move the guide latch mechanism 10 into restraining position, force is applied to the second or upper link 34 (FIG. 3) which pushes the latch pawl 30 in a counterclockwise direction shown by arrow 66 in FIG. 3. The end of the second link with shoulder 38 is rotated in a clockwise direction as shown by arrow 68 in FIG. 3 until it rests against stop 40. When second link 34 is against stop 40, the spring-loaded lock/unlock or detent lever 36 engages the shoulder 38 (FIG. 2).

In this position the guide latch mechanism 10 can restrain a cargo container 18 as shown in FIG. 1 in three directions, e.g., vertically, laterally and horizontally. The vertical and lateral restraints are shown in FIG. 2. The latch pawl 30 restrains container 18 in a vertical direction by engaging the lip 67 of cavity 20. The latch pawl 30 will also prevent container 18 from moving laterally to the right in FIG. 2 since the mechanism is in the locked position. A second guide latch mechanism or rail located on the opposite side of container 18 would prevent the container from moving to the left. The flat sides 69 (FIG. 1 and FIG. 4) of latch pawl 30 will engage the vertical sides 71 of the cavity 20 and prevent the container from moving along a longitudinal direction parallel to roller sets 14, 16 and 22.

In order to release the mechanism and permit the cargo container 18 to be moved, the lock/unlock or detent lever 36 is depressed. As the detent lever 36 is depressed, it releases shoulder 38 on the second link 34. Further depression of the detent lever causes the detent lever to engage pin 62 and to rotate the first link 32 in a clockwise direction in FIG. 2, thereby moving the alignment of links 32 and 34 from the overcenter position. Since the latch pawl 30 is spring-loaded in a clockwise direction, it will move clockwise or out of contact with the cargo container 18 or a pallet.

When a pallet 56 is in a position to overlap the guide latch mechanism 10 as shown in FIG. 4, it will contact the horn-shaped arms or cam surfaces 70 which are attached to the latch pawl 30. The pallet 56 will move along these arms 70 and deflect or force the latch pawl 30 below the level of the pallet 56 (FIG. 5). This movement of the latch pawl 30 below the level of the pallet 56 will take place whether the guide latch mechanism 10 is in the locked position (FIG. 1 and FIG. 2) or in the unlocked position (FIG. 3). The design of the locking mechanism to accomodate release of the pawl and depression below the level of the cargo is particularly important to the fast loading of a variety of cargo containers of various sizes which may overlap the mechanism 10.

The release of the locking mechanism is accomplished by the depression of the detent lever 36. With the depression of the detent lever 36, a counterclockwise (FIG. 2) rotational movement is imparted to the latch pawl 30, and shoulder 38 on link 34 disengages from detent lever 36.

The arms or cam surface 70 attached to the latch pawl 30 are designed to depress the latch pawl 30 even when it is in unlocked position as depicted in FIG. 3. Because of the design of the latch mechanism and the spring-loading of various components, the latch pawl 30 will rotate from the position in FIG. 3 to the depressed position of FIG. 5 without engaging the lock mechanism. When the pellet 56 has passed over the guide latch mechanism 10, the latch pawl 30 rotates in a counterclockwise direction and erects to the unlocked position as shown in FIG. 4.

While certain exemplary embodiments of this invention have been described above and shown in the accompanying drawings, it is to be understood that such embodiments are merely illustrative of, and not restrictive on, the broad invention and that we do not desire to be limited in our invention to the specific constructions or arrangements shown and described, since various other obvious modifications may occur to persons having ordinary skill in the art.

What is claimed is:

1. A retractable locking device for securing cargo containers on a floor in position comprising:
   a base having right and left ends, a line joining said ends being perpendicular to the loading direction of a cargo container;
   a first horizontal pivot axis in said base perpendicular to said line;
   a second axis in said base to the right and parallel to said first axis;
   an elongated pawl, the bottom of said pawl rotatably connected to said base at said first axis, said pawl adapted to rotate from a vertical position to a horizontal position with the free end of said pawl to the left of said first pivot axis, said free end of said pawl comprising a protrusion extending to the left for mating a matching depression of proper size in a cargo container;
   extensible means, one end of which is rotatably attached to said pawl and the opposite end of said means attached to said base at said second axis;
   cam means for depressing said pawl to the left and downward when an oversized cargo container is moved over said locking device in a loading direction; and
   locking means for releasably holding said extensible means to maintain the protrusion on said pawl in engagement with the depression in a cargo container and for automatic erection of said elongated pawl after the passage of an oversized cargo container.

2. The locking device of claim 1 wherein said extensible means comprises two interconnected links, a first link being mounted at one end at said second axis on said base for rotation, the opposite end of said first link being attached to said first end of said second link, and said second end of said second link attached to said pawl.

3. The locking device of claim 2 wherein the interconnection between said links comprises a groove on one link and a pin located in the end of the other link to ride in said groove.

4. The locking device of claim 3 wherein said locking means comprises stop means on said base and lock/release lever rotatably mounted to said base to hold an extensible link in a fixed position against said stop means.

5. the locking device of claim 4 wherein said cam means comprises horn-shaped protrusions on said pawl.

6. The locking device of claim 5 wherein said locking means comprises a first spring means to rotate the free end of said pawl to the vertical and to the right of said first pivot axis, and a second spring means to rotate the end of the first link not connected to the second axis away from said first pivot axis.

7. A retractable locking device for securing cargo containers in position on a floor comprising:
- a base having a horizontal line running in one direction therein parallel to the direction of loading of the containers;
- a first pivot axis running horizontally in said base parallel to said line;
- a second pivot axis in said base located to the right of and parallel to said first pivot axis;
- a hook member rotationally attached to the base at said first pivot axis, the free end of said hook member adapted to rotate from a vertical position to horizontal position to the left of said first pivot axis, said hook configured to engage a cavity in a container;
- cam means on said hook member for rotating said hook to the left and depressing said hook below an oversized cargo container which may be moved over said locking device;
- extensible means, one end of which is rotatably attached to said base at said second pivot axis, said extensible means also rotationally attached to said hook member; and
- locking means for holding said extensible means in fixed position to maintain said hook member in engagement with a cavity in a container and for automatic erection of said hook member after the passage of an oversized cargo container;
- unlocking means to release said extensible means to permit rotation of the hook member out of said cavity in a container.

8. The locking device of claim 7 wherein said extensible means comprises two interconnected links, one of which is rotationally attached to said base and the other link being rotationally attached to said hook member.

9. The locking device of claim 8 wherein said locking means comprises a stop located on said base, a shoulder on one of the links and a detent lever to hold said shoulder against said stop.

10. The locking device of claim 9 wherein said unlocking means comprises a coil spring located on said base to bias said hook out of engagement with a cavity in a cargo container, a pin on the end of one of said links which rides in a groove located in the other link and a coil spring located on said base biasing said first link away from said first pivot axis.

* * * * *